(12) United States Patent
Zlotnick et al.

(10) Patent No.: US 11,836,259 B2
(45) Date of Patent: Dec. 5, 2023

(54) BLOCKCHAIN TECHNOLOGY FOR REGULATORY COMPLIANCE OF DATA MANAGEMENT SYSTEMS

(71) Applicant: EMC IP Holding Company LLC, Hopkinton, MA (US)

(72) Inventors: David Zlotnick, Tel Aviv (IL); Natali Gaash, Netanya (IL); Roi Wexler, Kfar Saba (IL); Aviad Yisrael Gispan, Rishon Lezion (IL); Inbar Helbitz, Kiryat Ono (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 736 days.

(21) Appl. No.: 16/249,761

(22) Filed: Jan. 16, 2019

(65) Prior Publication Data

US 2020/0226268 A1 Jul. 16, 2020

(51) Int. Cl.
| | |
|---|---|
| *G06F 21/60* | (2013.01) |
| *G06F 9/54* | (2006.01) |
| *G06F 16/23* | (2019.01) |
| *G06F 21/62* | (2013.01) |
| *H04L 9/06* | (2006.01) |
| *H04L 9/00* | (2022.01) |

(52) U.S. Cl.
CPC ............ *G06F 21/602* (2013.01); *G06F 9/547* (2013.01); *G06F 16/2379* (2019.01); *G06F 21/62* (2013.01); *H04L 9/0637* (2013.01); *G06F 2221/2101* (2013.01); *H04L 9/50* (2022.05)

(58) Field of Classification Search
CPC .... G06F 16/2379; G06F 21/602; G06F 21/62; G06F 2221/2101; H04L 9/0637; H04L 2209/38
See application file for complete search history.

(56) References Cited

U.S. PATENT DOCUMENTS

| | | | | |
|---|---|---|---|---|
| 9,298,806 | B1 * | 3/2016 | Vessenes | G06F 16/244 |
| 9,317,686 | B1 * | 4/2016 | Ye | G06F 21/568 |
| 10,121,025 | B1 * | 11/2018 | Rice | G06F 21/10 |
| 10,291,395 | B1 * | 5/2019 | Nenov | H04L 9/3226 |
| 10,419,209 | B1 * | 9/2019 | Griffin | H04L 9/3263 |

(Continued)

FOREIGN PATENT DOCUMENTS

| | | |
|---|---|---|
| CN | 107133871 A | 9/2017 |
| CN | 108833330 A | 11/2018 |
| WO | 2018089843 | 5/2018 |

OTHER PUBLICATIONS

"Towards Blockchain-Driven, Secure Transparent Audit Logs"—Ahmad etal, Univ. of Central Florida, Nov. 25, 2018 https://arxiv.org/pdf/1811.09944.pdf (Year: 2018).

(Continued)

*Primary Examiner* — Gary S Gracia
(74) *Attorney, Agent, or Firm* — Workman Nydegger

(57) ABSTRACT

One example method includes performing a data management transaction, such as a data read operation, a data write operation, or a data delete operation, generating transaction metadata relating to the data management transaction, transmitting the transaction metadata to a blockchain network, and receiving, from the blockchain network, confirmation that the transaction metadata has been stored in a distributed ledger associated with the blockchain network.

18 Claims, 5 Drawing Sheets

(56) References Cited

U.S. PATENT DOCUMENTS

| | | | |
|---|---|---|---|
| 10,621,164 B1* | 4/2020 | Kain | G16H 80/00 |
| 10,673,617 B1* | 6/2020 | Antoniou | G06F 13/4282 |
| 10,698,879 B1* | 6/2020 | Todd | H04L 67/1097 |
| 11,164,254 B1* | 11/2021 | Gordon, III | G06Q 20/0658 |
| 2002/0196685 A1 | 12/2002 | Topham | |
| 2017/0046651 A1* | 2/2017 | Lin | G06F 21/62 |
| 2017/0206523 A1* | 7/2017 | Goeringer | G06Q 20/3827 |
| 2018/0018723 A1 | 1/2018 | Nagla et al. | |
| 2018/0082024 A1 | 3/2018 | Curbera et al. | |
| 2018/0082296 A1 | 3/2018 | Brashers | |
| 2018/0285479 A1 | 10/2018 | Mackay et al. | |
| 2018/0285839 A1 | 10/2018 | Yang et al. | |
| 2018/0302215 A1* | 10/2018 | Salgueiro | H04L 65/4025 |
| 2018/0374173 A1* | 12/2018 | Chen | H04L 9/3236 |
| 2019/0042620 A1* | 2/2019 | Garagiola | H04L 9/0637 |
| 2019/0130033 A1* | 5/2019 | Baumgardner | G06Q 10/1091 |
| 2019/0182284 A1* | 6/2019 | Signorini | G06F 21/602 |
| 2019/0213573 A1* | 7/2019 | Zelten | G06Q 20/407 |
| 2019/0229918 A1* | 7/2019 | Naqvi | H04L 9/3239 |
| 2019/0303621 A1* | 10/2019 | Baset | G06F 11/1479 |
| 2019/0354693 A1* | 11/2019 | Yoon | H04L 9/30 |
| 2019/0370358 A1* | 12/2019 | Nation | H04L 9/0643 |
| 2019/0379754 A1* | 12/2019 | Krishnaswamy | H04L 67/104 |
| 2019/0384834 A1* | 12/2019 | Nelluri | H04L 9/0643 |
| 2019/0391972 A1* | 12/2019 | Bates | H04L 9/50 |
| 2020/0021446 A1* | 1/2020 | Roennow | H04L 9/0819 |
| 2020/0057773 A1* | 2/2020 | Gamzin | G06F 16/381 |
| 2020/0067697 A1* | 2/2020 | Puddu | G06Q 20/3827 |
| 2020/0073758 A1* | 3/2020 | Natarajan | G06F 11/1474 |
| 2020/0074423 A1* | 3/2020 | Noble | H04L 9/50 |
| 2020/0092362 A1* | 3/2020 | Viswanathan | H04L 67/1095 |
| 2020/0142986 A1* | 5/2020 | Ragnoli | H04L 9/0894 |
| 2020/0167779 A1 | 5/2020 | Carver et al. | |
| 2020/0228530 A1* | 7/2020 | Zlotnick | H04L 63/10 |
| 2020/0264915 A1* | 8/2020 | Parapadakis | G06F 9/3005 |
| 2020/0327254 A1* | 10/2020 | Abilash | H04L 9/3218 |
| 2020/0342394 A1* | 10/2020 | Moore | H04L 63/102 |
| 2020/0349194 A1* | 11/2020 | Kundu | G06F 16/903 |
| 2020/0389318 A1* | 12/2020 | Irazabal | H04L 63/126 |
| 2020/0389495 A1* | 12/2020 | Crabtree | G06F 16/2477 |
| 2020/0394652 A1* | 12/2020 | Youb | G06Q 40/00 |
| 2020/0402168 A1* | 12/2020 | Johnson | G06Q 20/065 |
| 2021/0271662 A1* | 9/2021 | Muse | G16H 50/70 |
| 2022/0021728 A1 | 1/2022 | Kelly | |

OTHER PUBLICATIONS

Gipp et al., "Decentralized Trusted Timestamping using the Crypto Currency Bitcoin", Mar. 2015, National Institute of Informatics Tokyo, from the Proceedings of the iConference 2015—Newport Beach, CA, accessed via <http://ischools.org/the-iconference>, pp. 1-6.

International Search Report and Written Opinion for PCT/US2019/053874 dated Nov. 29, 2019.

International Search Report and Written Opinion for PCT/US2019/053879 dated Nov. 28, 2019.

U.S. Appl. No. 16/249,783, filed Jan. 16, 2019, Assaf Natanzon, et al.

U.S. Appl. No. 16/249,791, filed Jan. 16, 2019, David Zlotnick, et al.

International Search Report and Written Opinion for PCT/US2019/054574 dated Dec. 20, 2019.

Sutton et al., "Blockchain Enabled Privacy Audit Logs," Oct. 4, 2017, McMaster University, DOI: 10.1007/978-3-319-68288-4_38, pp. 1-17, accessed via <https://www.researchgate.net/publication/320203888>.

* cited by examiner

BLOCKCHAIN TECHNOLOGY FOR REGULATORY COMPLIANCE OF DATA MANAGEMENT SYSTEMS

RELATED APPLICATIONS

This application is related to U.S. patent application Ser. No. 16/249,783, entitled BLOCKCHAIN TECHNOLOGY FOR DATA INTEGRITY REGULATION AND PROOF OF EXISTENCE IN DATA PROTECTION SYSTEMS, filed the same day herewith. This application is also related to U.S. patent application Ser. No. 16/249,791, entitled LEVERAGING BLOCKCHAIN TECHNOLOGY FOR AUDITING CLOUD SERVICE FOR DATA PROTECTION COMPLIANCE, filed the same day herewith. All of the aforementioned applications are incorporated herein in their respective entireties by this reference.

FIELD OF THE INVENTION

Embodiments of the present invention generally relate to data protection. More particularly, at least some embodiments of the invention relate to systems, hardware, software, computer-readable media, and methods for facilitating regulatory compliance of data management systems and processes.

BACKGROUND

Increasingly, the handling of user data by storage systems and data management systems is governed by various regulatory requirements, including those set by governments concerning security and privacy, such as the General Data Protection Regulation (GDPR) issued by the European Union (EU). As well, the handling of user data is controlled, in some instances at least, by organizations such as the Securities and Exchange Commission (SEC). Yet other bodies have promulgated still other rules and regulations concerning the handling of user data.

Such regulatory requirements may present challenges to enterprises and other entities and organizations involved in creating and handling data. As well, such requirements change between industries and verticals, are different in each country/state, and continuously change in time. This further complicates the ability of an enterprise, for example, to comply, and prove compliance, with the applicable regulations.

Particularly, organizations may be required to provide a certification that their data management systems comply with the applicable regulatory requirements. This is typically done by way of auditing processes in which external auditors inspect the organization's data management implementation, policies and history.

Unfortunately, certification of data management systems is a complex, lengthy and costly process, as it involves manual inspection of large amounts of data distributed between many diverse information systems. Organizations are thus faced with the challenge, among others, of providing a unified reliable data source that will serve as legal proof-of-record for data management regulatory compliance certification.

In more detail, problems and complicating factors that organizations must deal with include a complex, and dynamic, regulatory environment, multiple different data management systems, and complex and costly certification processes. With regard to regulation for example, it is difficult for users, IT managers and business owners to keep abreast of the latest regulation, common practices and industry requirements in their field regarding data retention, protection, and security. In a related vein, it can be difficult for organizations to verify their compliance, and also verify that the changes in regulation do not require changes to their data protection policy.

As well, data volumes and variety are growing exponentially and require an auditor need to access and review multiple diverse systems in the organization. Finally, certification processes for regulatory compliance are often manual, time consuming and costly, due to the presence of multiple distributed data systems and a lack of adequate automation tools.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
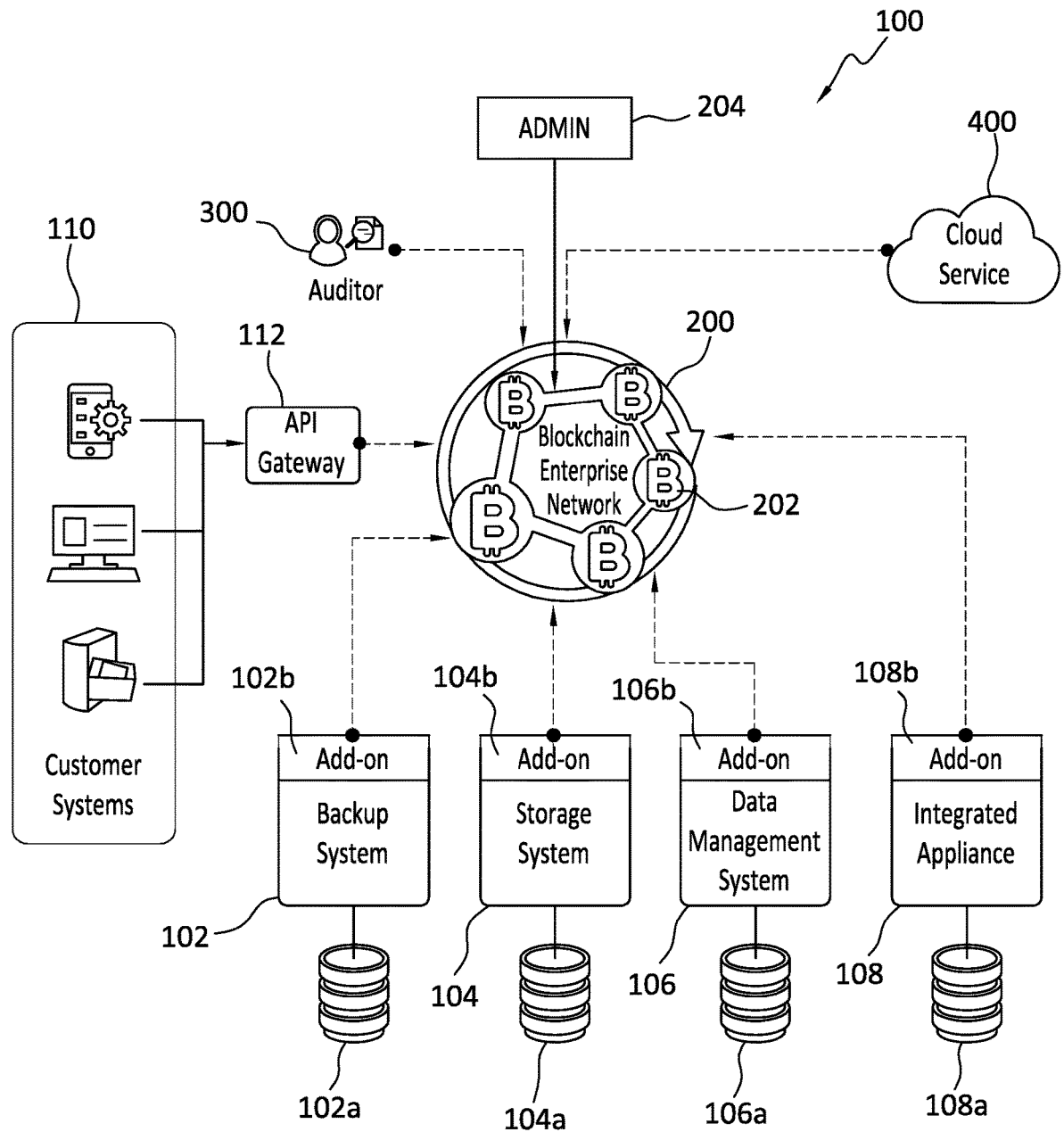
FIG. 1 discloses aspects of an example operating environment for some embodiments of the invention.

Embodiments of the present invention generally relate to data protection. More particularly, at least some embodiments of the invention relate to systems, hardware, software, computer-readable media, and methods for facilitating regulatory compliance of data management systems and processes.

One challenge faced by organizations/enterprises that use storage/data protection (DP)/data management (DM) systems is that the organizations are required to provide evidence of certification that all their various data systems and data entities comply with the relevant data protection regulations. The certification process in complex, costly, and time consuming as it is manually performed by external auditors that need to access and inspect multiple different IT systems within the organization, to provide the compliance statement. The knowledge that is required to achieve this is, is in many cases, above and beyond the capabilities of an average information technology (IT) person, a business owner, or even of an enterprise Compliance Officer. The auditors cannot accommodate the growth of data and are left to set only high level guidelines, at best, concerning how to deal with the data.

Thus, some example embodiments of the invention include, among other things, solutions that can connect multiple data protection and data management systems within an organization and provide a single, unified, reliable source of truth for certification of regulatory compliance. These example solutions employ blockchain technology that is used to create an enterprise blockchain network, connecting multiple data management systems by way of software plugins and network application programming interfaces (APIs). The regulated data protection and data management transactions in the organization will be logged on the enterprise blockchain network, creating a secure, encrypted, and non-editable, legal proof-of-record. In this way, embodiments of the invention may transform and simplify the certification process of data protection regulatory compliance, by providing the auditor with a unified, reliable and transparent source of truth that leverages the capabilities of the blockchain technology.

In general, some example embodiments of the invention embrace an enterprise blockchain network that is constructed from blockchain software plugins to existing storage systems, data protection systems and data management systems in the organization. By adding a blockchain software plugin to these systems, those systems become nodes in the enterprise blockchain network.

For each relevant data management operation that takes place on these systems, the transaction metadata will be registered as a block on the blockchain network. Such metadata may include, for example, attributes such as: date and time of the transaction; transaction id; data management system id; data protection policy relating to data implicated by the transaction; physical location of the data; and, proof of data deletion for data delete operations.

For performance considerations, a group of one or more data management transactions can be aggregated to a single blockchain data block, based on configurable parameters concerning consolidation logic for the transactions. For example, it may sometimes be the case that publishing transactions, on an individual basis, to the blockchain network may not be practical due to the volume of transactions. To illustrate, if there are multiple storage transactions, or backup transactions, per second, it may be more efficient to periodically aggregate the transactions and then send the metadata for the aggregated transactions to the blockchain network at the same time. Thus, parameters that may be considered when determining whether, and how, to aggregate data management transactions may include, but are not limited to, and the number of data management transactions per block, the maximum rate of blocks that can be created per minute. These parameters are provided only by way of example, and other parameters may be used to inform aggregation methods.

The blockchain network can thus serve as a unified source of truth for all data management transactions in the organization, for the purpose of regulatory compliance certification, and/or other purposes. Finally, storing the data protection operations on the blockchain network leverages the blockchain capabilities as an implementation of a distributed ledger technology, that is secure, encrypted, immutable, i.e., non-editable, and transparent.

Advantageously then, embodiments of the invention may provide various benefits and improvements relative to conventional hardware, systems and methods. To illustrate, an embodiment of the invention may provide processes for configuring an enterprise network having multiple nodes to operate as a blockchain network, at least with respect to data handling operations. A related embodiment of the invention is an enterprise network, or portion thereof, that is configured to implement blockchain functionality. As such, at least some embodiments of the invention may provide for modification of data protection solutions, and data networks, to include blockchain functionality.

The blockchain functionality implemented in various embodiments of the invention may include, but is not limited to, creation and maintenance of secure, encrypted, non-editable, records concerning enterprise data handling operations and may enable an enterprise to, among other things, affirmatively demonstrate that one or more particular data transactions or data operations did, or did not, take place. By way of illustration, embodiments of the invention may enable an enterprise to affirmatively establish that particular data was deleted, and also when and where that data was deleted. As another example, embodiments of the invention may enable an enterprise to affirmatively establish that particular data was encrypted, and also when and where that data was encrypted.

In one or more embodiments, information stored in the blockchain ledger may be remotely accessible by one or more nodes of the enterprise network and/or by an external network. Thus, embodiments may enable new processes for verifying customer compliance with applicable regulations, while also improving a customer experience at the enterprise, and for auditors.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular attention now to FIG. 1, an operating environment 100 may comprise, or consist of, a data protection environment. The data protection environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

In general, the example configuration in FIG. 1 discloses an enterprise blockchain network connecting storage, data protection and data management systems in an organization. Also disclosed in FIG. 1 are cloud service connectivity, and an API gateway enabling integration with customer-specific IT systems and applications. This example embodiment enables the organization to obtain all data management compliance information from the blockchain network.

As particularly indicated in FIG. 1, the operating environment 100 may include various data protection systems, components, and software, such as a backup system 102, storage system 104, data management system 106, and integrated appliance 108, which may be referred to generally herein as data protection elements. One or more of these data protection elements may be an out-of-the-box element, that is, hardware and/or software purchased from a vendor, such as Dell-EMC for example.

The aforementioned data management elements may all be associated with a single common enterprise or organization, but that is not required and, in other embodiments, multiple different enterprises or organizations can include data protection elements such as those indicated in FIG. 1. As well, the data management elements may each comprise, or consist of, hardware and/or software. Each of the data management elements 102 through 108 may comprise, or have access to, storage facilities 102a, 104a, 106a, and 108a, such as databases for example, that are able to support read/write/delete operations associated with the operation of the data protection elements 102, 104, 106, and 108.

The backup system 102, storage system 104, data management system 106, and integrated appliance 108, may each include a respective extension 102b, 104b, 106b, and 108b, that, in general, enable those data management elements to interact with a blockchain network 200, as discussed below. Any of the extensions 102b, 104b, 106b, and 108b, may be provided as part of an out-of-the-box hardware/software installation. As well, any of the extensions 102b, 104b, 106b, and 108b may comprise, or consist of, a blockchain plugin/API. Each of the backup system 102, storage system 104, data management system 106, and integrated appliance 108 can use its respective extension 102b, 104b, 106b, and 108b to interact with the blockchain network 200, even if those data protection elements are not fully qualified nodes on the blockchain network 200.

In general, and as discussed in further detail herein, each of the data management elements may communicate data transaction information to the blockchain network 200. Moreover, data management elements can be added to, or removed from, the operating environment 100 at any time. This may occur when for example, a data management element is removed from service, or replaced with another data protection element. There is no limit to the number of data management elements that may operate in connection with the blockchain network 200.

With continued reference to FIG. 1, the example operating environment 100 may also include one or more customer-specific data management systems 110, that is, any hardware/software not obtained out-of-the-box from a vendor. One example of such a customer-specific data management system 110 is an enterprise resource planning (ERP) system. The customer-specific data management systems 110, like the data management elements 102 . . . 108, may communicate with the blockchain network 200 concerning data transactions implemented in connection with the customer-specific data management systems 110.

In one example embodiment, customer-specific data management systems 110 communicate with the blockchain network 200 by way of a dedicated software node that serves as an API gateway 112. As well, the API gateway 112 may externalize standard APIs, such as Representational State Transfer (REST) APIs, that will enable data management elements, such as the customer-specific data management systems 110 for example, in the organization that are not integrated as fully qualified nodes on the blockchain network, to publish data management operations and register them on the blockchain. As such, the API gateway 112 may be considered as a generic blockchain network gateway, since it is not necessarily associated with any particular hardware/software data management platform. The API gateway 112 may be part, such as a node, of the blockchain network 200, or may be an element of the customer-specific data management systems 110.

Among other things, the API gateway 112 may simplify the integration of the blockchain network 200 with customer-specific data management systems 110, and will allow organizations to create a customized solution, of logging an additional granularity of data management operations according to their business needs and the regulatory requirements.

As further indicated in FIG. 1, and discussed in more detail elsewhere herein, the blockchain network 200 may be configured to communicate not only with one or more data management entities of an enterprise, but also with various external entities as well. The external entities may, or may not, be associated with the enterprise. For example, the blockchain network 200 may be accessible by an auditor 300, which may be a third party auditor, such as a government auditor, so that the auditor 300 can make various determinations concerning the handling of data by the data management elements of the enterprise. As another example, the blockchain network 200 may be connectible to a cloud service, such as a cloud service of the party that provides one or more out-of-the-box data management elements to the enterprise.

In more detail, the blockchain network 200 may also be connected to a cloud service (SaaS) 400 of a software provider, such as DELL-EMC for example, that will serve as an off-site node on the blockchain. As such, access to the ledger may be obtained by way of the cloud service 400. As such, cloud service applications may transmit data management transaction information to the ledger, and otherwise communicate with the ledger, by way of the cloud service 400.

This arrangement, in which the blockchain network is connected to the cloud service 400, may provide a variety of benefits. For example, storage of the enterprise data management operations on a trusted off-site node can provide assurance of a high level of availability of data management operation information to the enterprise. As another example, the cloud service 400 may serve as a central access point for external auditors performing certification processes since, in some embodiments, each blockchain node may retain the entire transaction history for all data management elements of the enterprise.

B. Blockchain Network

With continued reference to FIG. 1, further details are provided concerning example blockchain networks that may be employed in connection with one or more embodiments of the invention, where one such example blockchain network has been denoted at 200. In general, and as noted elsewhere herein, one or more embodiments employ a blockchain network that is constructed from blockchain software plugins to existing storage systems, data protection systems and data management systems in the organization. By adding a blockchain software plugin such as, for example, the extensions 102b, 104b, 106b, and 108b, to these systems they will become nodes in the blockchain network 200.

The blockchain network 200 may comprise, or consist of, a plurality of host devices, each of which may be a respective node 202 of the blockchain network 200. In other embodiments, multiple nodes 202 of the blockchain network 200 may reside on, or otherwise be associated with, a single host device. More generally, the blockchain network 200 need not have any particular form or configuration, and the foregoing are thus presented only by way of example. The nodes 202 collectively define a ledger that holds information concerning all of the enterprise transactions. That is, all of the data management transactions are registered on all of the nodes of the network. The ledger may receive transaction information that includes a tag or other identifier, identifying the source data management element involved in the transaction.

The blockchain network 200 may additionally include an administrator 204. The administrator 204 may be attached to any of the nodes 202 of the blockchain network 200. The administrator 204 may also communicate with external entities and nodes, such as an auditor 300 and a cloud service 400. In some embodiments, the administrator 204 handles incoming data management transaction metadata, as well as requests to access data in the ledger.

In at least some embodiments, the blockchain network 200 comprises an enterprise blockchain network and, as such, is not accessible by public entities, or entities that have not been authorized for access by the enterprise. As such, the data transaction information in an enterprise blockchain network is not generally accessible to the public, but may be accessible to authorized third parties such as auditors for example. Such a blockchain network may be referred to as a permissioned, or private, blockchain network.

In other embodiments, a blockchain network may be a public blockchain network freely accessible by one or more public entities, as well as by the enterprise. Such public blockchain networks may also be referred to as open, or permissionless, blockchain networks.

In yet further embodiment, a blockchain network may be a consortium blockchain network. A consortium blockchain network may include one or more nodes, each of which is associated with a respective entity or enterprise. Access to the consortium blockchain network nodes may be controlled by the respective entities associated with those nodes and/or by an administrator designated by the entities.

In terms of its operation, embodiments of a blockchain network, such as the blockchain network 200 for example, comprise a distributed ledger that can be used to record transactions between two or more parties. The ledger is accessible by any authorized party of a private blockchain network, or by any party in the case of a public blockchain network. Thus, embodiments of the blockchain network take the form of a peer-to-peer network whose members, or nodes, each adhere to established protocols for communication and the handling of transactions among members, such as the creations of new blocks in the blockchain. In at least some embodiments, the blockchain records in the ledger cannot be modified except with the consensus of all parties to a transaction.

In general, and by way of illustration, each data management operation, such as for a data object, constitutes a data transaction that results in the creation, by the blockchain network, of a corresponding block in a blockchain. Each block may be considered as an entry in the blockchain ledger. In at least some embodiments, a respective ledger may be provided for each node of the blockchain network and, as such, all data transactions from an entity such as data management element 102, which are directed to a nodes specific to that data management element 102, may be registered in a single ledger. In this way, an auditor, for example, can perform an entity-specific audit of the enterprise to which the data management element 102 belongs. The foregoing is presented only by way of example however, and ledgers can be assigned and employed in any other suitable way.

It should be noted that, in at least some embodiments, the actual data of the enterprise or other entity is not stored in the blockchain network 200. Rather, only the transactional information concerning that data resides in the blockchain network 200. The actual data of the enterprise can be stored locally at the enterprise site, and/or at a cloud datacenter, and/or other sites.

C. General Aspects of Example Blockchain Transactions

With continued reference to the discussion of FIG. 1 and blockchain networks, further details are provided now concerning aspects of the operation of a blockchain network such as the example blockchain network 200. In general, for each relevant data management operation that takes place on the enterprise data management elements, the transaction meta-data will be registered as a block on the blockchain network. As used herein, the term 'transaction' is intended broadly and embraces, among other things, any operation, or group of operations, affecting data that is managed by an enterprise or other entity. Such operations include, but are not limited to, data protection operations. With this in view, metadata associated with a transaction may include, but is not limited to, attributes such as: date and time of a data transaction; a transaction id; a data management system id of a data management system that performs, and/or causes the performance of, the transaction; a data protection policy associated with the data; physical location of the data; and, proof of deletion for delete operations, and/or proof of any other data management operation. In some embodiments, performance may be enhanced by aggregating several data management transactions to a single blockchain data block, based on configurable parameters.

As the present disclosure thus makes clear, the blockchain network 200 can serve as a unified source of truth for all data management transactions in the organization, for the purpose of regulatory compliance certification and/or other purposes. As well, storing the data protection operations on the blockchain network 200 leverages the blockchain capabilities as an implementation of a distributed ledger technology, that is secure, encrypted, immutable, that is, non-editable, and transparent.

D. Example Host and Server Configurations

Figure 2:
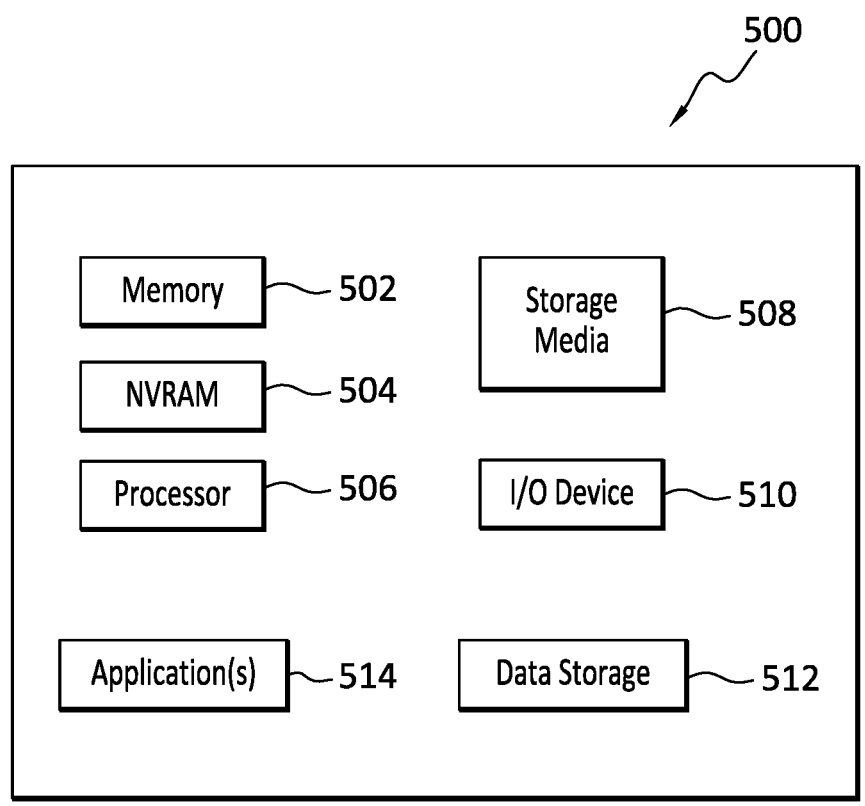
FIG. 2 discloses aspects of an example host configuration.

With reference briefly now to FIG. 2, any one or more of the data management elements 102 . . . 108, customer-specific data management systems 110, API gateway 112, nodes 202, ledgers 204, auditor node 300, and cloud service 400, can take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 2.

In the example of FIG. 2, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 can take the form of solid state device (SSD) storage. As well, one or more applications 514 are provided that comprise executable instructions. Such executable instructions can take various forms including, for example, instructions executable to perform any method or portion thereof disclosed herein, and/or executable by/at any of a storage site, whether on-premised at an enterprise, or a cloud storage site, client, datacenter, backup server, blockchain network, or blockchain network node, to perform functions disclosed herein. As well, such instructions may be executable to perform any of the other operations disclosed herein including, but not limited to, read, write, backup, and restore, operations and/or any other data protection operation, auditing operations, cloud service operation, blockchain operations, data management element operations, blockchain node operations, and blockchain ledger operations.

E. Example Methods

Figure 3:
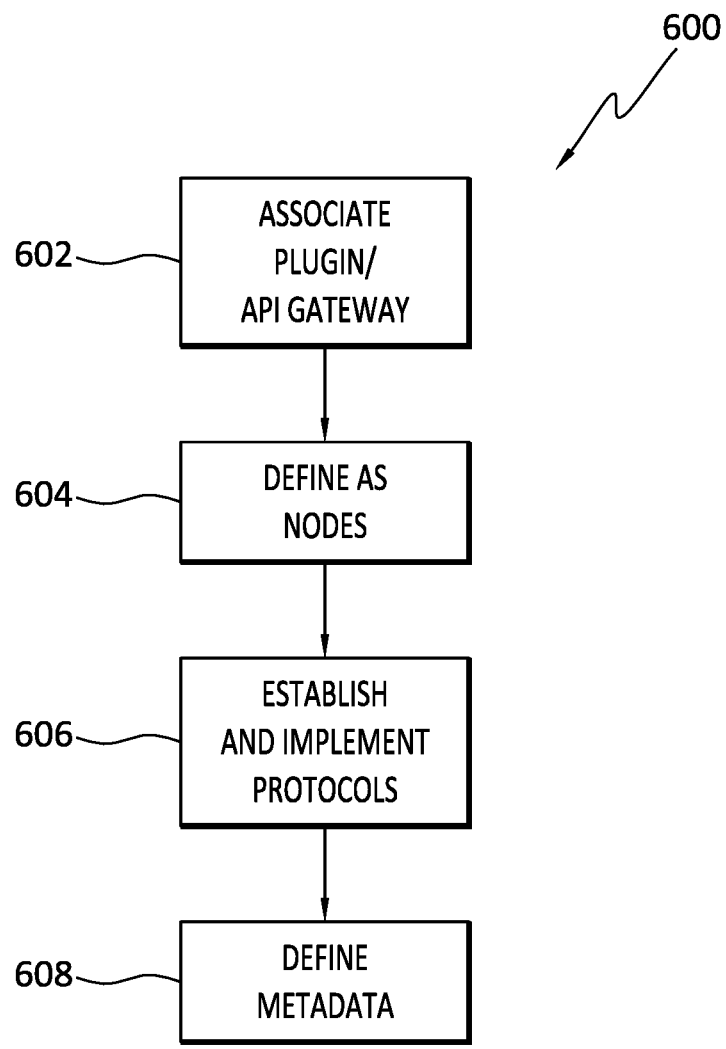
FIG. 3 is a flow diagram that discloses some general aspects of a method for creating an enterprise blockchain network.

With attention now to FIG. 3, aspects of example methods are disclosed. One particular method is denoted generally at 600 and concerns creation of a private enterprise blockchain network that is configured, and operates, to record data management transactions by one or more data management elements. In some embodiments, part, or all, of the method 600 may be performed at an administrator console or other entity. The administrator console, which can be hosted on a server for example, may present various user interfaces (UI) to an authorized user. The authorized user can then enter input at various prompts provided by way of the UI, so as to create the blockchain network. A UI may be presented to a user for each of the processes of method 600, although that is not necessarily required. In some instances, entry of input by way of a UI automatically triggers presentation of the next succeeding UI, although that is not necessarily required. Blockchain network configurations may be retrievably stored in a library and may be added, modified, or deleted, as needed.

The method may begin at 602 wherein a respective plugin or API gateway, as applicable, is associated with one or more data management elements. Only those data management elements whose transactions are of interest need be associated with a plugin or API gateway. Thus, the blockchain network may involve all the nodes of an enterprise network, or fewer than all the nodes of the enterprise network.

When the plugin or gateway has been associated with a data management element, the data management element can then be designated 604 as a node of the enterprise blockchain network. That is, adding a blockchain software plugin or an API gateway to a data management element enables that data management element to function as a node of the blockchain network. If desired, the status of the data management element as a blockchain node can be disabled at any time, such that the data management element is no longer able to participate in, or effect, blockchain operations.

After the various nodes of the blockchain network have been designated 604, communication and other protocols concerning operation of the blockchain network may be established 606. These protocols may specify, for example, how transactions are to be handled between/among the nodes of the blockchain network. One example of such a transaction concerns how new blocks in the blockchain will be created and managed.

The method 600 may also include processes for the identification of the transaction metadata 608 that will be captured and stored in the ledger. Some examples of such metadata are disclosed elsewhere herein. In some embodiments, a respective metadata profile, which includes a listing or other aggregation of metadata types, may be defined for each different type of data management transaction. A metadata profile may also, or alternatively, be defined based on a particular data management element, that is, a metadata profile may be defined that is specific to a particular data management element.

It should be noted, that as with the other methods and processes disclosed herein, the order of the various processes in the method 600 may be different than what is indicated, and the disclosed processes are not required to be performed in the order indicated in the Figures. To illustrate, in FIG. 3, the definition of the metadata 608 may take place prior to establishment of communication and other protocols 606.

Figure 4:
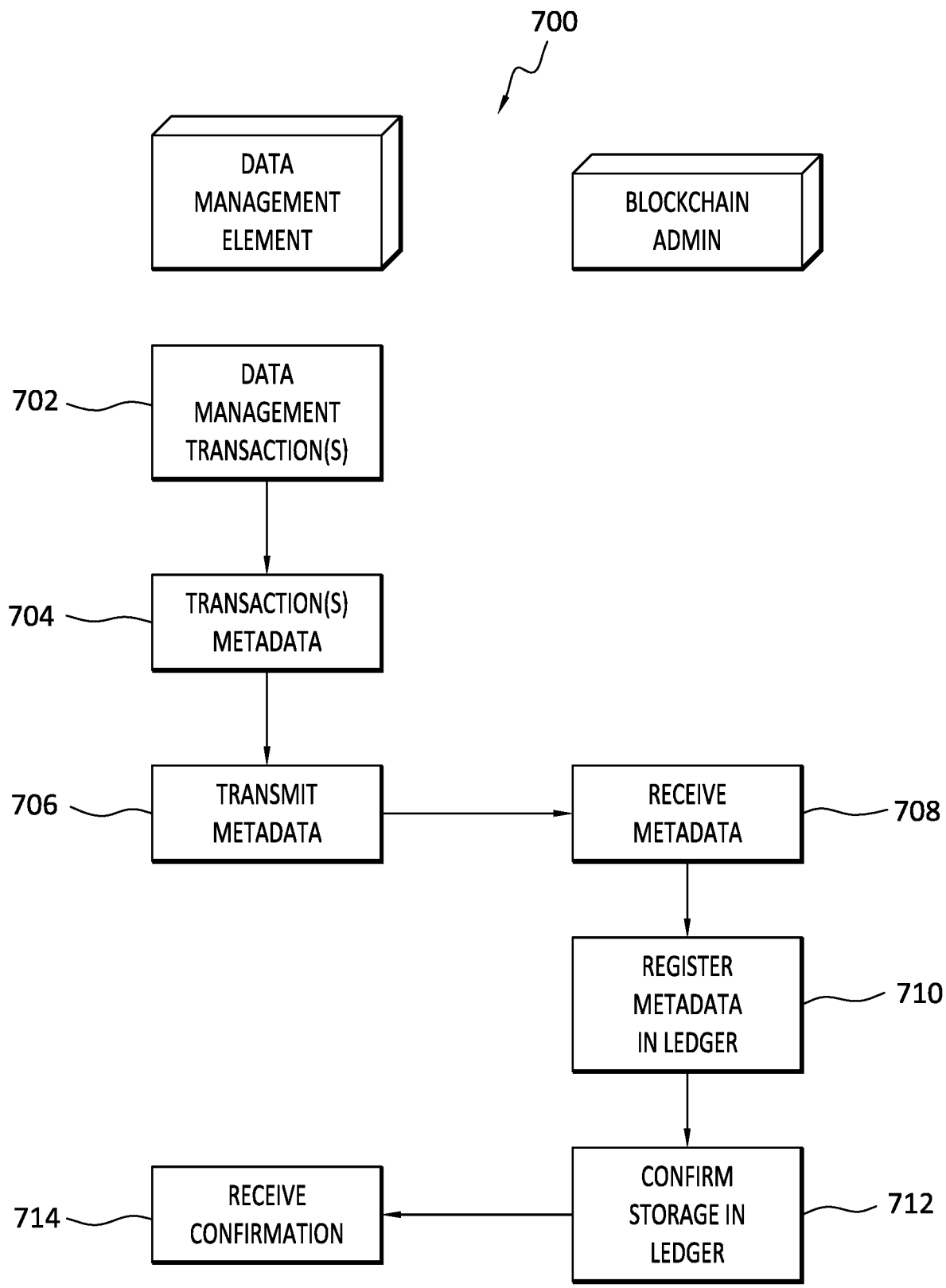
FIG. 4 is a flow diagram that discloses some general aspects of a method for storing data management transaction metadata in a blockchain network.

With reference next to FIG. 4, aspects of example methods are disclosed. One particular method is denoted generally at 700 and concerns the handling of data management transactions in a blockchain network environment, such as an enterprise blockchain network for example. In some embodiments, the method 700 may be cooperatively performed by an application hosted by a data management element and by a ledger of a blockchain network, although the scope of the invention is not limited to the example functional allocation illustrated in FIG. 4. The process 700 may be repeated each time a data management transaction, or group of data management transactions, is/are performed.

The method may begin at 702 where a data management element, or group of data management elements, performs, and/or causes the performance of, one or more data management transactions, examples of which are disclosed herein. Connection with performance of the data management transaction 702, the data management element, and/or other elements of the blockchain network, may generate and capture 704 metadata, automatically in some embodiments in response to performance of the data management transaction, concerning the data management transaction. Examples of such data management transaction metadata are disclosed elsewhere herein. Such metadata may be stored by the data management element(s) involved in the data management transaction. The metadata may concern a single data management transaction, or multiple data management transactions. The data management transactions may be performed by, and/or at the direction of, any node(s) of the blockchain network, including a cloud service node, examples of which are discussed in connection with FIG. 1.

After the data management transaction metadata has been generated and captured 704, the data management transaction metadata may be transmitted 706 by the data management element(s) to the rest of the nodes on the blockchain network. In some embodiments, the data management transaction metadata is transmitted 706 on a per-transaction basis. In other embodiments, data management transaction metadata for multiple data management transactions, whether from a single data management element or multiple different data management elements, may be aggregated together by the data management element before transmission 706 to the blockchain network.

At 708, the data management transaction metadata is received by the nodes in the blockchain network, and then once validated, the metadata is entered 710 in the distributed ledger of the blockchain network. Before, or after, storage in the blockchain network, the data management transaction metadata may be encrypted. Encryption of the data management transaction data may be performed by/at the data management node or elsewhere, such as at the transmitting data management element(s) for example. Once stored in the blockchain network 710, the data management transaction metadata may be secure, encrypted, non-editable, and transparent to one or more of the other nodes and/or authorized parties.

After the data management transaction metadata has been entered in the distributed ledger of the blockchain network 710, the blockchain nodes may generate and transmit a confirmation notice 712 to the data management element(s) from which the data management transaction metadata was received. This confirmation 712, when received 714 by the data management element(s), provides proof to the data management element(s) that the data management transaction metadata is securely stored on the blockchain network.

Figure 5:
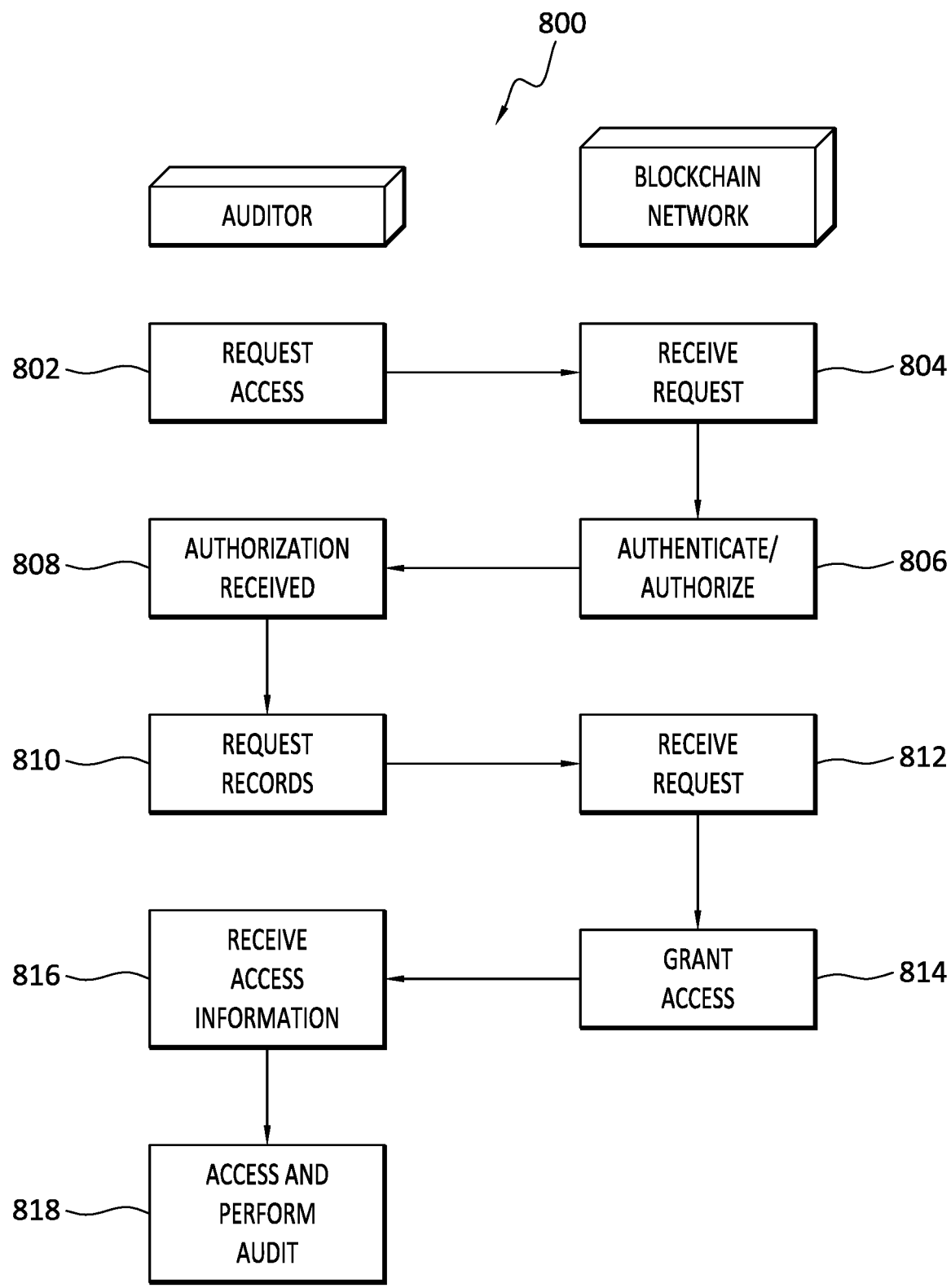
FIG. 5 is a flow diagram that discloses some general aspects of a method for auditing data management transaction metadata in an enterprise blockchain network.

With reference next to FIG. 5, aspects of example methods are disclosed. One particular method is denoted generally at 800 and concerns the use of a blockchain network in connection with auditing processes concerning data management transactions. In some embodiments, the method 800 may be cooperatively performed by an auditing node and associated audit application hosted at the auditing node, in cooperation with a blockchain network, such as an enterprise blockchain network. The method 800 may be repeated each time an audit of transactions captured in a ledger is performed. Part, or all, of the method 800 may be performed automatically, such as on a recurring basis, according to a set schedule, in response to the occurrence or non-occurrence of an event, or on any other basis. In other embodiments, the method 800 is performed ad hoc when it is determined that there is a need for an audit. More generally, the method 800 can be performed on any basis. Finally, operations of the method 800 involving the blockchain network may be performed by, and/or at the direction of, a blockchain network administrator, although that is not required.

The method 800 may begin when a user at an auditor node or auditor site requests access 802 to a ledger of the blockchain network with which the ledger is associated. As noted herein, the auditor node or auditor site may take the form of a server, for example, that hosts an audit application that is operable to perform various processes of the method 800. The access request may be received 804 at the blockchain network, such as by an administrator of the blockchain network for example. The auditor node may be located at the enterprise site, that is, on-premises, or may be located remotely, or off-premises, from the enterprise site.

At 806, the blockchain network may grant access if a credential provided by the auditor node in connection with the request 802 is determined, such as by an administrator of the blockchain network, to be valid. In some instances, the auditor need not request access. For example, when the blockchain network is an enterprise blockchain network, the auditor node may reside within the enterprise network and, as such, is permitted read access to the ledger records at any time. However, the authorization process beginning at 802 may be implemented where the auditor node is an entity that is external to the enterprise, such as a computer of a regulatory body for example.

When the access request 802 is granted, the auditor may receive 808 an indication that access to the ledger has been granted. In some embodiments, access to the ledger by the auditor refers to read-only access, that is, the auditor is not permitted to modify the ledger data in any way. After receipt 808 of confirmation that access has been granted, the auditor may then request the records, or a range of records, to which access is needed. The request can be made on any basis including, but not limited to: the type(s) of data management transactions involved, such as read, write, or delete, for example; the identity of the entity whose data is involved; a timeframe during which data management transactions occurred; the nature of the data involved, for example, personal data or financial data; the entities involved in data management transactions; and/or, any other basis pertaining to one or more data management transactions.

The request for ledger records 810 is then received 812 at the blockchain network, such as by a blockchain administrator for example, and the blockchain network then grants access 814 to the requested ledger records, and the auditor receives 816 a confirmation that access has been granted. Such access may be limited to read/view access, but may additionally or alternatively include copy/save access to the ledger records.

Finally, the auditor may access the desired records and perform an audit 818 of those records. Because the records are securely stored in the ledger, and cannot be modified, the auditor is assured that the records accurately reflect the data management transactions that have occurred. For the same reason, the entity that generated the records is, in some embodiments at least, unable to modify the records in any way once the records are stored in the ledger.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    performing, by a data protection node that comprises a node of a blockchain network, a data management transaction, wherein the data protection node comprises a system operable to perform data backup operations;
    generating, by the data protection node, transaction metadata relating to the data management transaction;
    creating aggregated metadata by aggregating the transaction metadata with other metadata relating to another data management transaction;
    transmitting, by the data protection node, the aggregated metadata to the blockchain network; and
    receiving, by the data protection node from the blockchain network, confirmation that the aggregated metadata has been stored in an immutable ledger, and the immutable ledger serves only the data protection node.

2. The method as recited in claim 1, wherein the data management transaction comprises any one or more of: a data read operation; a data write operation; and, a data delete operation.

3. The method as recited in claim 1, wherein the immutable ledger is accessible by an authorized audit node that comprises a node of the blockchain network.

4. The method as recited in claim 1, wherein the immutable ledger enables performance of an audit directed specifically to data protection processes performed by the data protection node.

5. The method as recited in claim 1, wherein the data management transaction comprises a data delete operation, and the transaction metadata comprises proof of data deletion for the data delete operation.

6. The method as recited in claim 1, wherein the transaction metadata comprises any one or more of: date and time of the data management transaction; transaction id; data management system id; data protection policy relating to data implicated by the data management transaction; physical location of data involved in the data management transaction; and, proof of data deletion.

7. The method as recited in claim 1, wherein the data protection node is operable to communicate with the blockchain network by way of a blockchain plugin at the data protection node.

8. The method as recited in claim 1, wherein the aggregated metadata is transmitted to the blockchain network by way of an API gateway that is used for connectivity with an external system.

9. The method as recited in claim 1, wherein receiving confirmation that the aggregated metadata has been stored in the immutable ledger comprises receiving, from the blockchain network, confirmation that the aggregated metadata has been registered as a block on the blockchain network.

10. A non-transitory storage medium having stored therein computer-executable instructions which, when executed by one or more hardware processors, perform the following operations:
performing, by a data protection node that comprises a node of a blockchain network, a data management transaction, wherein the data protection node comprises a system operable to perform data backup operations;
generating, by the data protection node, transaction metadata relating to the data management transaction;
creating aggregated metadata by aggregating the transaction metadata with other metadata relating to another data management transaction;
transmitting, by the data protection node, the aggregated metadata to the blockchain network; and
receiving, by the data protection node from the blockchain network, confirmation that the aggregated metadata has been stored in an immutable ledger, and the immutable ledger serves only the data protection node.

11. The non-transitory storage medium as recited in claim 10, wherein the data management transaction comprises any one or more of: a data read operation; a data write operation; and, a data delete operation.

12. The non-transitory storage medium as recited in claim 10, wherein the immutable ledger is accessible by an authorized audit node that comprises a node of the blockchain network.

13. The non-transitory storage medium as recited in claim 10, wherein the immutable ledger enables performance of an audit directed specifically to data protection processes performed by the data protection node.

14. The non-transitory storage medium as recited in claim 10, wherein the data management transaction comprises a data delete operation, and the transaction metadata comprises proof of data deletion for the data delete operation.

15. The non-transitory storage medium as recited in claim 10, wherein the transaction metadata comprises any one or more of: date and time of the data management transaction; transaction id; data management system id; data protection policy relating to data implicated by the data management transaction; physical location of data involved in the data management transaction; and, proof of data deletion.

16. The non-transitory storage medium as recited in claim 10, wherein the data protection node is operable to communicate with the blockchain network by way of a blockchain plugin at the data protection node.

17. The non-transitory storage medium as recited in claim 10, wherein the aggregated metadata is transmitted to the blockchain network by way of an API gateway that is used for connectivity with an external system.

18. The non-transitory storage medium as recited in claim 10, wherein receiving confirmation that the aggregated metadata has been stored in the immutable ledger comprises receiving, from the blockchain network, confirmation that the aggregated metadata has been registered as a block on the blockchain network.

* * * * *